UNITED STATES PATENT OFFICE.

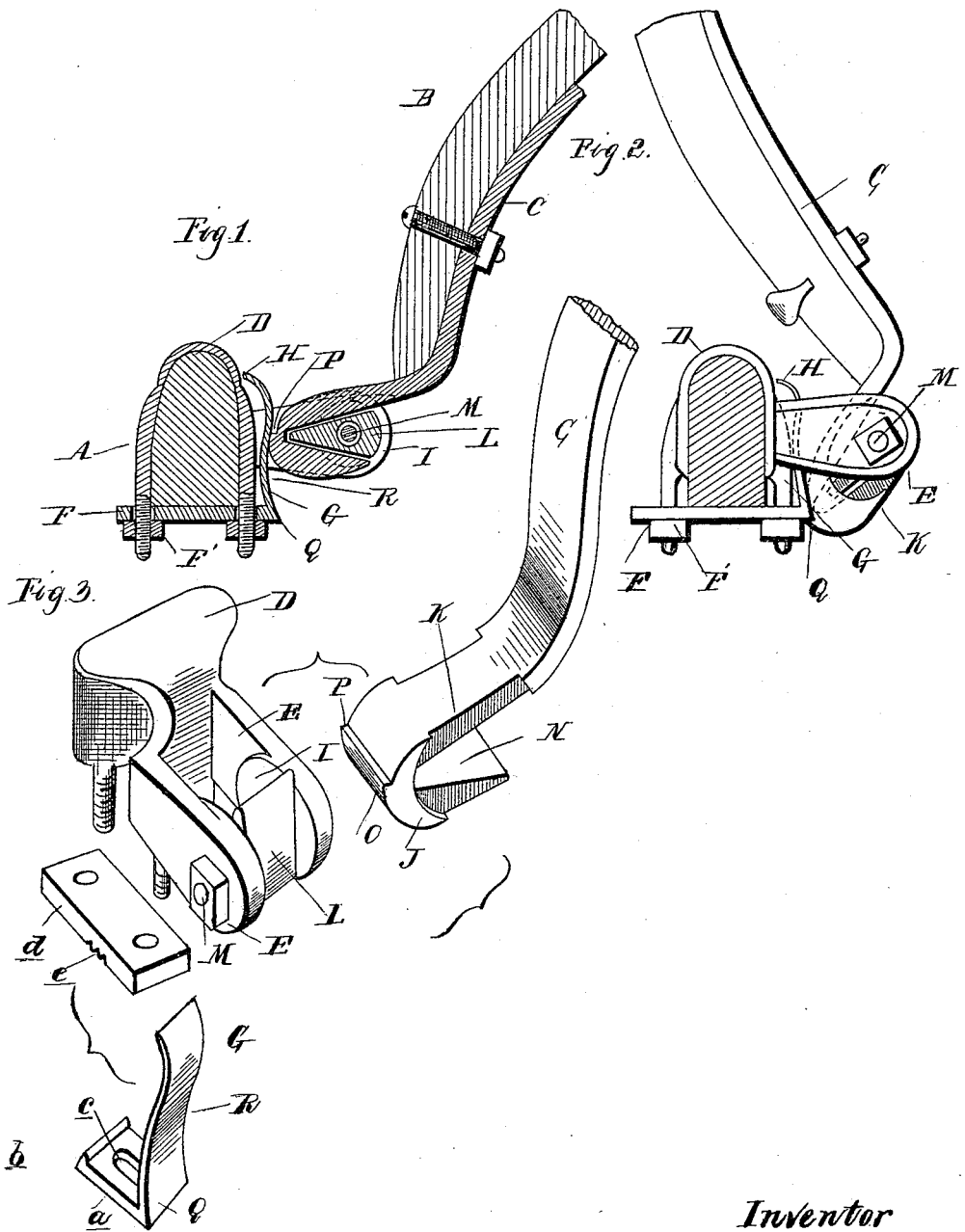

AARON KERRY, OF MARYSVILLE, MICHIGAN.

THILL-COUPLING.

SPECIFICATION forming part of Letters Patent No. 458,107, dated August 18, 1891.

Application filed April 15, 1891. Serial No. 389,103. (No model.)

*To all whom it may concern:*

Be it known that I, AARON KERRY, a citizen of the United States, residing at Marysville, in the county of St. Clair and State of Michigan, have invented certain new and useful Improvements in Thill-Couplings, of which the following is a specification, reference being had therein to the accompanying drawings.
This invention relates to new and useful improvements in a combined thill-coupler and anti-rattler; and the invention consists in the peculiar construction of the shaft-iron, the draw-jack, and the spring for preventing the rattling of the parts, all as more fully hereinafter described.

In the drawings, Figure 1 is a vertical central longitudinal section through my improved coupler, showing it with the shafts in horizontal position. Fig. 2 is an elevation thereof, the shafts located in their vertical position. Fig. 3 shows a detached perspective view of the various parts of my device with a modified form of anti-rattler spring.
A is the axle.

B are the shafts.

C is the shaft-iron.

D is a clip embracing the axle and having formed integral therewith the forwardly-extending arms E, forming the draw-jack. The clip is secured to the axle by means of the clip-plate F and nuts F'. To the clip-plate F, I preferably secure the spring G, extending vertically between the arms E of the draw-jack and preferably provided at its upper end with the rearwardly-curved arm H bearing against the front edge of the clip.

I are lugs extending inwardly from the inner faces of the arms E and having the curved rear face, with which the correspondingly-curved bearing J on the thill-irons C are adapted to engage. The thill-iron is provided with the cut-away portion K upon both sides to allow of its turning around the lugs I.
L is a triangular-shaped block pivoted upon the bolt M, passing through the draw-jack and adapted to enter a corresponding double-inclined recess N in the thill-iron.

To engage the parts, the axle A is lifted a sufficient distance to allow of engaging the double-inclined bearing N upon the block L, which is turned to a substantially vertical position. Then as the axle is lowered and the shafts raised the parts assume the position shown in Fig. 1, the bearing J working on the curved faces of the lugs I and the block L turning with the vertical movement of the shaft. The rear side of the thill-iron is provided with an extension O and a shoulder or notch P. As the shaft assumes a horizontal position, this extension bears against the spring G, compressing the same and holding the parts in position, preventing any possibility of rattling. When the shafts are lifted to a substantially vertical position, the shoulder or notch P is adapted to engage with the projection Q at the base of the spring, which will hold the shaft in its raised position. It will necessarily have a limited sliding movement up and down, and the block L forms a necessary guide for the thill-iron in this vertical movement. To lower the shafts, they are first raised to disengage the shoulder P from the extension Q, and then their weight will cause them to assume a horizontal position, compressing the spring, as before described. The spring is preferably provided with a curved bearing R, against which the extension O works to give it the least possible friction. Instead of making the spring G integral with the clip-plate F, I may make it a separate piece, as shown in Fig. 3, providing it with a rearward extension *a*, having the rib *b* and the aperture *c*, through which aperture the bolt of the clip passes. The clip-plate *d* in this construction is preferably notched at *e* to receive the rib and allow of adjusting the spring in or out.

It is evident that as the draft from the thills is applied to the draw-jack, the curved bearings J, and the curved faces of the lugs I, even if the bolt M should be lost, there is no danger of the thills becoming detached, and that there is therefore no wear whatever upon the bolt.

What I claim as my invention is—

1. In a thill-coupling, the combination, with the clip having forwardly-extending arms, lugs on the inner faces of the arms, having curved rear edges forming bearings, a thill-iron, a curved rearward extension on the end of the thill-iron, outwardly-extending lugs on the sides of the thill-iron having curved front faces corresponding with the curvature of the lugs on the arms, a pintle, and a spring connected to the clip and extending up between the arms, its lower end forming a shoulder, with which the projection on the thill-iron engages when the shafts are elevated, substantially as described.

2. In a thill-coupling, the combination, with the clip, arms extending out from the front thereof, projections on the inner faces of the arms having curved rear edges forming bearings, a thill-iron having a hooked end and formed with lateral curved bearings on its end engaging the bearings of the arms and cut-away portions on both sides adjacent to the upper ends of the bearings, a triangular block fitted in the hooked end of the thill-iron, a pintle passing through the block and arms, an extension on the end of the thill-iron, having a flat upper face forming a shoulder, and a spring secured to the clip and extending up between the arms, its lower end being bent at right angles to form a shoulder arranged in the path of the extension on the thill-iron, substantially as described.

In testimony whereof I affix my signature in presence of two witnesses.

AARON KERRY.

Witnesses:
M. B. O'DOGHERTY,
N. L. LINDOP.